US010511610B2

(12) United States Patent
Courbon et al.

(10) Patent No.: US 10,511,610 B2
(45) Date of Patent: Dec. 17, 2019

(54) LOCATION BASED TRUSTED COMPUTING NODES IN A CLOUD COMPUTING ARCHITECTURE

(71) Applicant: FRANCE BREVETS, Paris (FR)

(72) Inventors: Pierre Courbon, Sceaux (FR); Andrew Denys Hackett, Servon sur Vilaine (FR)

(73) Assignee: FRANCE BREVETS, Paris (FR)

(*) Notice: Subject to any disclaimer, the term of this patent is extended or adjusted under 35 U.S.C. 154(b) by 0 days.

(21) Appl. No.: 15/358,391

(22) Filed: Nov. 22, 2016

(65) Prior Publication Data
US 2017/0155662 A1 Jun. 1, 2017

(30) Foreign Application Priority Data

Dec. 1, 2015 (EP) .................................... 15306898

(51) Int. Cl.
*H04L 29/06* (2006.01)
(52) U.S. Cl.
CPC ............ *H04L 63/107* (2013.01); *H04L 63/08* (2013.01); *H04L 63/1466* (2013.01)
(58) Field of Classification Search
CPC ... H04L 63/107; H04L 63/0492; H04L 63/08; H04L 63/12; H04L 63/1466; H04L 63/20
See application file for complete search history.

(56) References Cited

U.S. PATENT DOCUMENTS

| 8,320,938 | B2 * | 11/2012 | Meyer .................... G01S 5/021 |
| | | | 370/310.2 |
| 9,686,686 | B1 * | 6/2017 | Dalvi .................... H04W 12/12 |
| 9,854,556 | B2 * | 12/2017 | Skaaksrud ............ H04W 12/06 |
| 2005/0120031 | A1 * | 6/2005 | Ishii ................... G06F 17/30734 |

(Continued)

FOREIGN PATENT DOCUMENTS

| JP | 2001-033537 | 2/2001 |
| WO | WO 2004/114694 A1 | 12/2004 |

(Continued)

OTHER PUBLICATIONS https://commons.wikimedia.org/wiki/File:TPM.svg#/media/File:TPM.svg File created: Sep. 18, 2008.

(Continued)

*Primary Examiner* — Sher A Khan
(74) *Attorney, Agent, or Firm* — Meagher Emanuel Laks Goldberg & Liao, LLP

(57) ABSTRACT

The invention discloses trusted computing nodes (TCNs) configured to control their location and migration of applications run on virtual machines resident thereon. The invention allows a controlled use of cloud computing resources and virtual network functions by sensitive applications. This is achieved by embedding a secure processing unit (SPU) and a localization unit (LU) in the TCNs. The LU acquires GNSS signals and the TCN generates a secure location message comprising a secure ID and a locstamp of the TCN. A TCN Registry may be created by an operator of a collection of TCNs as a database of trust scores of the trusted (Continued)

computing nodes which will be used to control the allocation of tasks to said TCNs based, at least in part; on the trust scores. The trust scores may also be used directly by the other TCNs to allocate the tasks which they have control on.

14 Claims, 7 Drawing Sheets

(56) References Cited

U.S. PATENT DOCUMENTS

| | | | | |
|---|---|---|---|---|
| 2009/0199192 | A1* | 8/2009 | Laithwaite | G06Q 10/109 718/104 |
| 2009/0254572 | A1* | 10/2009 | Redlich | G06Q 10/06 |
| 2010/0287025 | A1* | 11/2010 | Fletcher | G06Q 10/06 705/7.15 |
| 2013/0130708 | A1* | 5/2013 | Chhaya | H04W 64/00 455/456.1 |
| 2013/0165157 | A1* | 6/2013 | Mapes | H04W 4/029 455/456.5 |
| 2013/0198797 | A1* | 8/2013 | Raghuram | G06F 21/57 726/1 |
| 2013/0246302 | A1* | 9/2013 | Black | G06Q 30/0185 705/347 |
| 2013/0311764 | A1* | 11/2013 | Alpert | H04L 9/0816 713/150 |
| 2014/0007097 | A1* | 1/2014 | Chin | G06F 9/45533 718/1 |
| 2015/0288671 | A1* | 10/2015 | Chan | H04L 63/0227 726/1 |
| 2015/0332075 | A1* | 11/2015 | Burch | G06K 7/10821 345/156 |
| 2015/0365393 | A1* | 12/2015 | Shyamsunder | G06F 16/245 726/4 |
| 2016/0198301 | A1* | 7/2016 | Howe | H04W 4/023 455/456.2 |
| 2016/0247105 | A1* | 8/2016 | Vaze | H04W 4/029 |
| 2017/0006417 | A1* | 1/2017 | Canoy | H04L 63/126 |

FOREIGN PATENT DOCUMENTS

| | | | |
|---|---|---|---|
| WO | 2013101094 A1 | 7/2013 | |
| WO | 2013191945 A1 | 12/2013 | |
| WO | WO-2016036858 A1 * | 3/2016 | G06F 9/45558 |

OTHER PUBLICATIONS

Delaune et al., ENS Cachan, INRIA, CNRS, Birmingham University, "A Formal Analysis of Authentication in the TPM", vol. 6561 of the series Lecture Notes in Computer Science pp. 111-125, Aug. 25, 2010.

Paladi, Nicolae et al., "Trusted Geolocation-Aware Data Placement in Infrastructure Clouds", 2014 IEEE 13th International Conference on Trust, Security and Privacy in Computing and Communications, IEEE Sep. 24, 2014 (Sep. 24, 2014), pp. 352-360.

Raymond NG, "Trusted Platform Module TPM Fundamental", Aug. 12, 2008 (Aug. 12, 2008), XP055259921, Retrieved from the Intenat: URL:http://www.cs.unh.edu/-it666/reading_1ist/Hardware/tpm fundamentals.pfd.

KR Office Action issued in corresponding KR application No. 10-2016-0160104, dated Oct. 11, 2018.

* cited by examiner

LOCATION BASED TRUSTED COMPUTING NODES IN A CLOUD COMPUTING ARCHITECTURE

FIELD OF THE INVENTION

The present invention applies to the field of cloud computing (i.e. provisioning of delocalized computing resources) or virtual networking infrastructure (i.e. a networking infrastructure using cloud computing). More specifically the focus of the invention is on computing nodes on which a number of computing tasks may be performed because they have a trusted physical location.

BACKGROUND

There is an increased pressure to optimize the distribution of tasks which require significant and/or variable computing resources over networks of computing nodes. This is done by allocating the processes which execute the tasks to a number of virtual machines (VM) which can be created at a moment in time on a first physical machine or cluster of machines and then may or may not be migrated, partially or in totality, to a second physical machine or cluster when the first one has not enough capacity, is used for other tasks which take precedence, or has a cost of usage which has increased. Private and shared or public cloud resources have therefore been developed. Private cloud resources are data centers which belong to a single operator and are permanently under its control. These resources may nevertheless be located in different geographical locations, including in different countries. Shared cloud resources are for instance formed by collections of portions of private data centers the owners of which lease their excess capacity to a third party operator which will rent this excess capacity to users, i.e. Infrastructure as a Service (IaaS). There are a number of different types of contracts under which the usage may be controlled and priced. In most of these cases, the end user and third party operator, have no idea of where his/her/their application is executed. Allocation of applications to VMs and to physical machines will take into account availability and/or Quality of Service (QoS). It may further take into account the cost of the resource at a moment in time.

The location of the physical machine is normally not taken into account in perform allocation. This would contradict the basic principles of a cloud architecture which is by definition location agnostic.

But this is seen as a barrier to a wider use of the cloud infrastructure by a number of possible users for a number of reasons.

For instance, it may be advantageous to constrain some heavy duty tasks on machines which are located in proximity to dense user areas. This is for example the case for video distribution edge servers because of the degradation of the QoS which results from a high latency.

Also, some restrictions may apply to certain applications, which are based on local regulations. It is notably the case for tax laws, copyright licenses, privacy laws, electronic data retention laws, and legal intercepts.

Some users may also not want that their mission critical applications be executed on servers which may be located in countries over which they have no control. In addition, such users may also be sensitive to the higher vulnerability of servers which have a large diversity of users. For instance, a telecommunication operator will need to make sure that its key processes (network management, client relations management, billing, access point management, network handover management, etc.) remain in a definite jurisdiction and are executed on computing nodes which are better protected against malicious attacks (hacking, corruption, data piracy, etc. . . . ).

Secure processing units have been developed and normalized to ensure that a computing node can be trusted. These secure processing units are capable of executing in a physically confined environment authentication, encryption and decryption functions.

The use which is done of these functions depends on the security policy which is implemented on the host on which they are integrated. They can be used to authenticate access of authorized users to the trust zones of the host, to encrypt all data travelling outside of the trust zone, and/or to generate a signature of messages sent by the host to other hosts.

It has also been proposed to supplement the signature of computing nodes in the cloud by a fixed geotag which gives the location of the node (National Institute of Standards Internal Report 7904, US Department of Commerce, July 2015).

Such an association does not offer a guarantee that the node has not been moved from its authorized location to another location and does not provide the kind of guarantee which is needed for some of the applications which will be probably deployed on machines located in the cloud in the coming years.

It is therefore an object of the invention to overcome this limitation.

SUMMARY OF THE INVENTION

This is done by providing the computing node an access to a GNSS (Global Navigation Satellite System) localization service and using a secure processing unit embedded in the computing node to generate a secure authentication message comprising a localization stamp and an ID of the computing node.

To this effect, the invention discloses a computing node comprising: a central processing unit; a secure processing unit, configured to execute one or more of an authentication, an encryption or a decryption functions; an access to position data of the computing node, said position data obtained from a localization unit comprising one or more GNSS receivers localized at the computing node; wherein the secure processing unit is configured to produce a locstamp derived from the position data and an ID stamp of the computing node, and the computing node is configured to generate a secure location message comprising the locstamp and the ID stamp.

Advantageously, the one or more GNSS receivers and the secure processing unit share a same trusted zone.

Advantageously, the one or more GNSS receivers are configured to generate trusted position data.

Advantageously, the one or more GNSS receivers are configured to detect spoofing.

Advantageously, the computing node of the invention further comprises an access to an output of an inertial measurement unit mounted with the computing node.

Advantageously, the computing node of the invention further comprises an access to a receiver of a cellular phone network providing an access to computing node position data based on positions of base stations of the cellular network.

Advantageously, the computing node of the invention further comprises an access to a network time reference.

Advantageously, the secure location message further comprises one or more of a timestamp, a signature of the computing node, a description of the resources of the computing node and a state of the computing node.

Advantageously, the computing node of the invention is further configured to run one or more virtual machines and a hypervisor.

Advantageously, the computing node of the invention further comprises an input port configured to receive an in-bound data stream from a communication network and an output port configured to send an out-bound data stream to the communication network.

The invention also discloses a method of operating a collection of computing nodes, one or more of the computing nodes comprising: a central processing unit; a secure processing unit, configured to execute one or more of an authentication, an encryption or a decryption functions; an access to position data of the computing node, said position data obtained from a localization unit comprising one or more GNSS receivers localized at the computing node; the secure processing unit being configured to produce a locstamp derived from the position data and an ID stamp of the computing node; the computing node being configured to generate a secure location message comprising the locstamp and the ID stamp; said method comprising making available at the one or more computing nodes an information representative of the secure location message.

Advantageously, the method of the invention further comprises: obtaining at a scheduler of the collection of computing nodes one or more secure location messages from the one or more of the computing nodes; comparing the ID stamp and the locstamp in the one or more secure location messages with ID data and location data of said computing nodes in a registry of trusted computing nodes; determining a trust score of the computing node.

Advantageously, the method of the invention further comprises recording the determined trust score of the one or more computing nodes in the registry of trusted computing nodes.

Advantageously, the method of the invention further comprises obtaining the determined trust score of the one or more computing nodes at a task scheduler.

Advantageously, the method of the invention further comprises using the determined trust score of the one or more computing nodes as a constraint of allocation of tasks at the task scheduler.

Advantageously, the method of the invention further comprises archiving the secure location message at the trusted computing node, together with a timestamp.

Advantageously, the method of the invention further comprises: obtaining a secure location message available at one of the computing nodes in the collection of computing nodes at another computing node; comparing the ID stamp and the locstamp in the one or more secure location messages with ID data and location data of said computing nodes in a registry of trusted computing nodes; determining at said another computing node a trust score of said one of the computing nodes.

Thanks to the invention, trusted computing nodes are provided to which the virtual machines processing country-bound and/or mission-critical tasks can be directed. As an additional advantage, the supervisor of the network or computing facility will be capable of permanently monitoring the location of a trusted computed node. Advantageously, a trust score of the computing node can be computed, stored and maintained. This allows an operator of a cloud computing service to give its clients a warranty that their applications will be executed on certified computing nodes. Thus doing, the scope of applications which can be executed in a cloud architecture is enlarged without jeopardizing the protection of personal data, intellectual property rights or government missions.

BRIEF DESCRIPTION OF THE DRAWINGS

The invention will be better understood and its various features and advantages will become apparent from the description of various embodiments and of the following appended figures.

DETAILED DESCRIPTION

Figure 1:
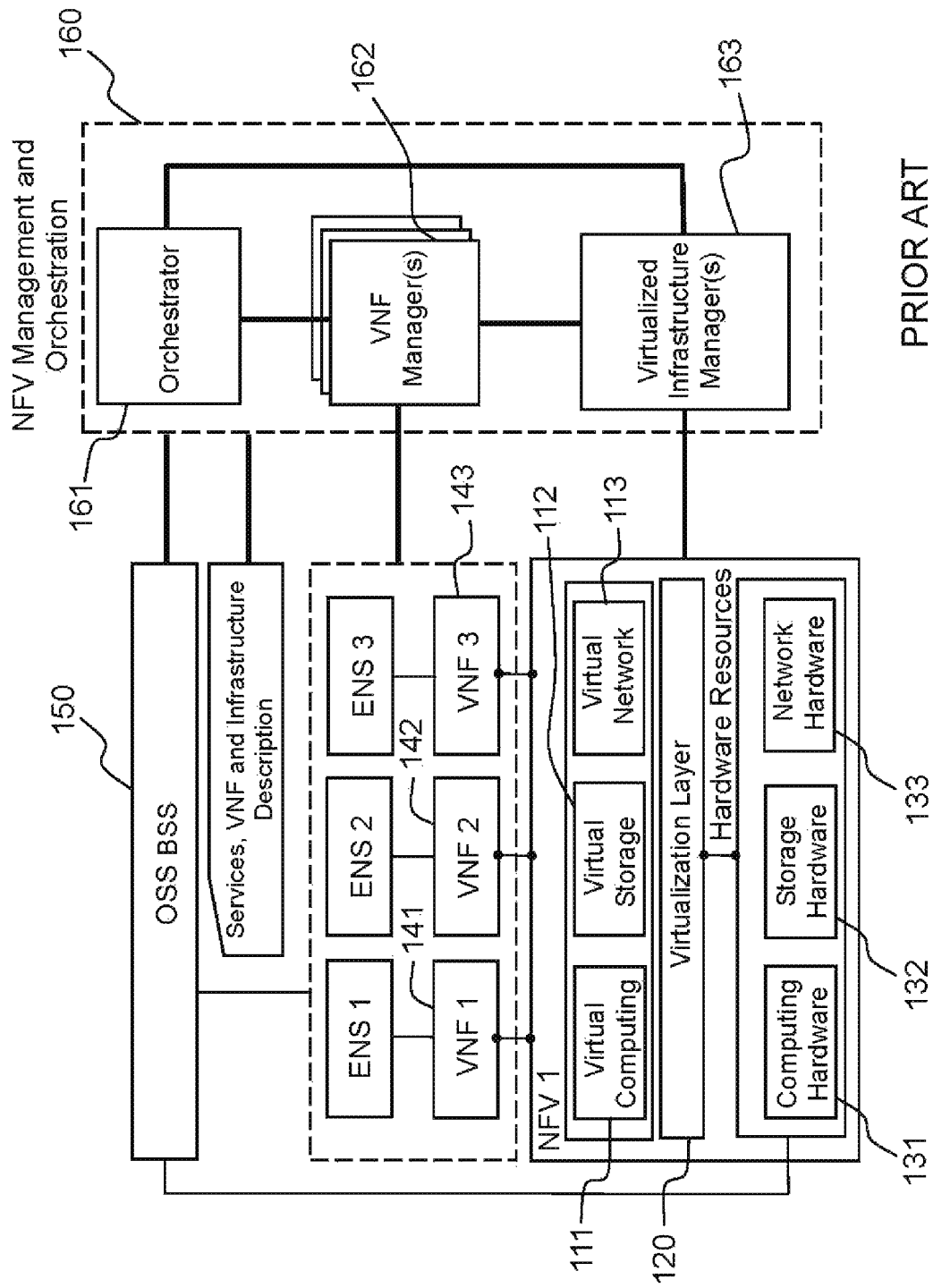
FIG. 1 represents a classical architecture of a Network Function Virtualization architecture of the prior art.

FIG. 1 represents a classical architecture of a Network Function Virtualization architecture of the prior art.

FIG. 1 is a simplified representation of a schematic drawn from document ETSI GS NFV-INF 001, V1.1.1 (2015-01) which presents an overview of the Network Functions Virtualization (NFV) Infrastructure as seen by the Industry Specification Group of the European Telecommunications Standards Institute (ETSI). The purpose of NFV is to use general purpose computers to perform the main functions of the nodes of a telecommunications network, like routing, switching, securing, which are traditionally performed by special purpose hardware (routers, switches, firewalls, gateways, etc.).

A number of VMs, 111, 112, 113, dedicated to computing, storage, or networking tasks, respectively, are controlled by a Virtualization Layer or Hypervisor, 120. The VMs run on a number of Computer Hardware resources, 131, 132, 133. They execute a number of applications or functions, VNF or Virtual Network Functions, 141, 142, 143. These building blocks are served by an Operational Support System—Business Support System (OSS-BSS), 150 to ensure availability of the network services and invoice them. The network is managed by an NFV Management and Orchestration function 160, which includes an Orchestrator 161, which manages the distribution, allocation and scheduling of the tasks and functions to the different VMs and computing nodes, a VNF Manager, 162, which manages the application layer, and an Virtualized Infrastructure Manager, 163, which manages the Virtualization Layer.

The Orchestrator is in principle capable of sending any VNF to be executed on any Computing Hardware or Network Hardware, anywhere in the world.

This is taken as an example only of an application of a cloud computing architecture to a specific service, i.e. a telecommunications networking architecture. Any kind of other computing infrastructure may face the same type of problem as an NFV infrastructure. In particular, this may be the case of a Software Defined Network (SDN), where it may be useful or necessary to locate the network resources and/or the SDN controllers.

Figure 2:
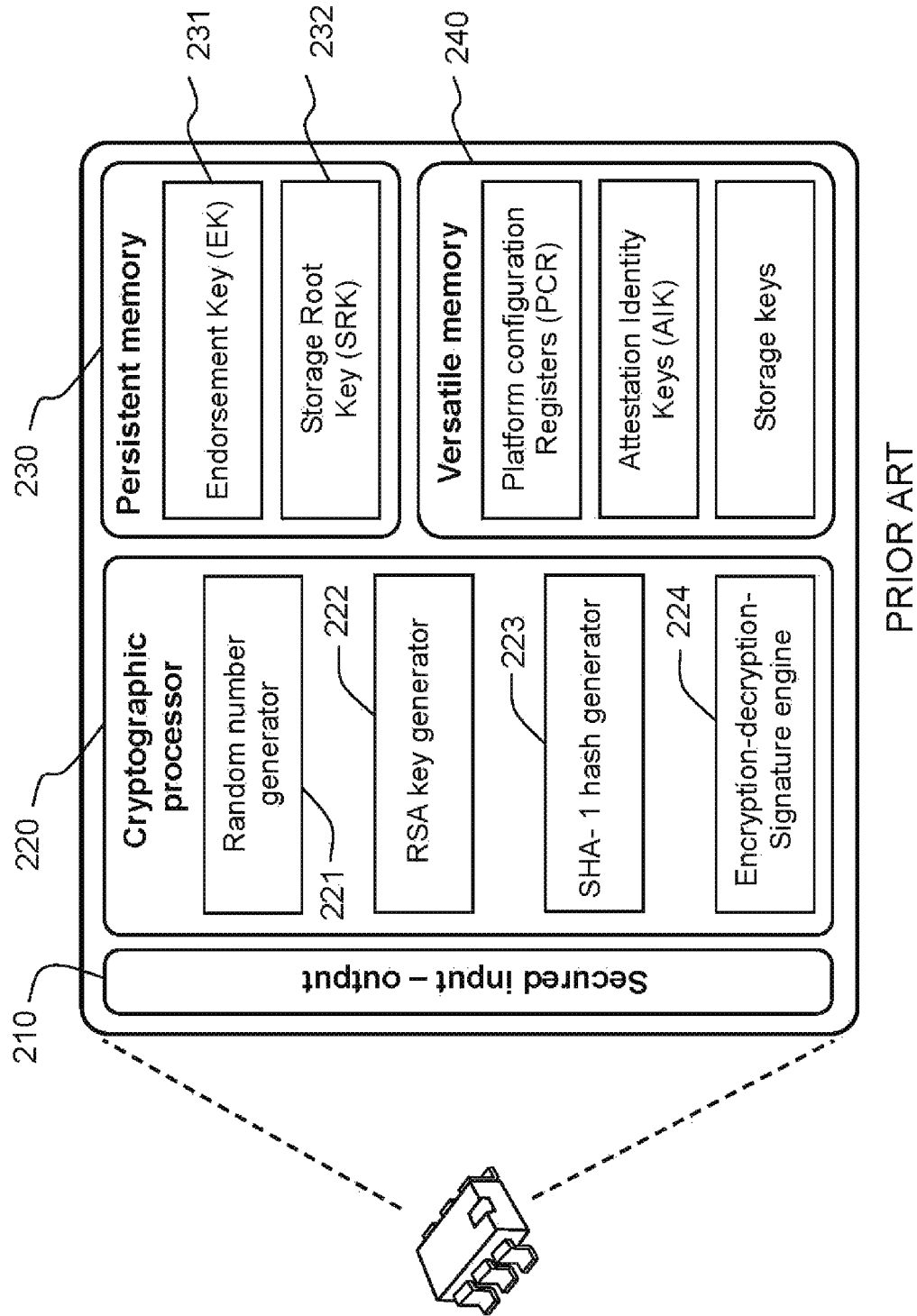
FIG. 2 represents a computing node comprising a secure processing unit of the prior art.

FIG. 2 represents a computing node comprising a secure processing unit of the prior art.

FIG. 2 is extracted from the following internet address: https://commons.wikimedia.org/wiki/File:TPM.svg#/media/File:TPM.svq. Credit is given to «TPM» by Eusebius (Guillaume Piolle).

The Trusted Computing Group (TCG), a computer industry special interest group, developed the Trusted Platform Module (TPM) standard which provides a partial response to this challenge. It was normalized in 2009 by the International Standard Organization (ISO) and the International Electrotechnical Commission (IEC) under reference ISO/IEC 11889. A TPM is a microcontroller which is dedicated to the execution of encryption, decryption and authentication functions.

By way of example of a secure processing unit or SPU, a TPM has a secured input/output module, 210, a cryptographic processor 220, a persistent memory, 230 and a versatile memory, 240.

The cryptographic processor comprises a number of modules: a random number generator, 221, a RSA key generator, 222, a SHA-1 hash generator, 223 and an encryption-decryption-signature engine, 224.

The persistent memory stores the Endorsement Key, 231, and the Storage Root Key (SRK), 232. The Endorsement Key is unique to the TPM and is burnt in the hardware at the time of manufacture. It is never sent out of the TPM. The SRK is personal to the user of the TPM and is used to create codes for the applications which use the TPM.

A TPM is therefore well suited to ensure that a defined level of trust can be accorded to a specific computing node. More details on the operations and security functions of a TPM may be found in Delaune et alii, ENS Cachan, INRIA, CNRS, Birmingham University, "A Formal Analysis of Authentication in the TPM", Volume 6561 of the series *Lecture Notes in Computer Science* pp 111-125.

A Hardware Security Module (HSM) is another type of SPU which has been developed for specific applications, such as on-line payment. HSMs are dedicated heavy duty crypto-chips which are capable of executing a few thousand RSA 2048 bits encrypt/decrypt operations per second. This may create some latency in a number of applications. The cost/benefit analysis of using HSM versus TPM will depend on the application and the threats against which one has to protect oneself.

Other types of SPUs may be developed in the future, which may be used to authenticate computing nodes. It may also be contemplated that an ASIC or an FPGA may be developed to integrate in the same hardware a CPU and a SPU, for instance to execute critical VNF.

Figure 3:
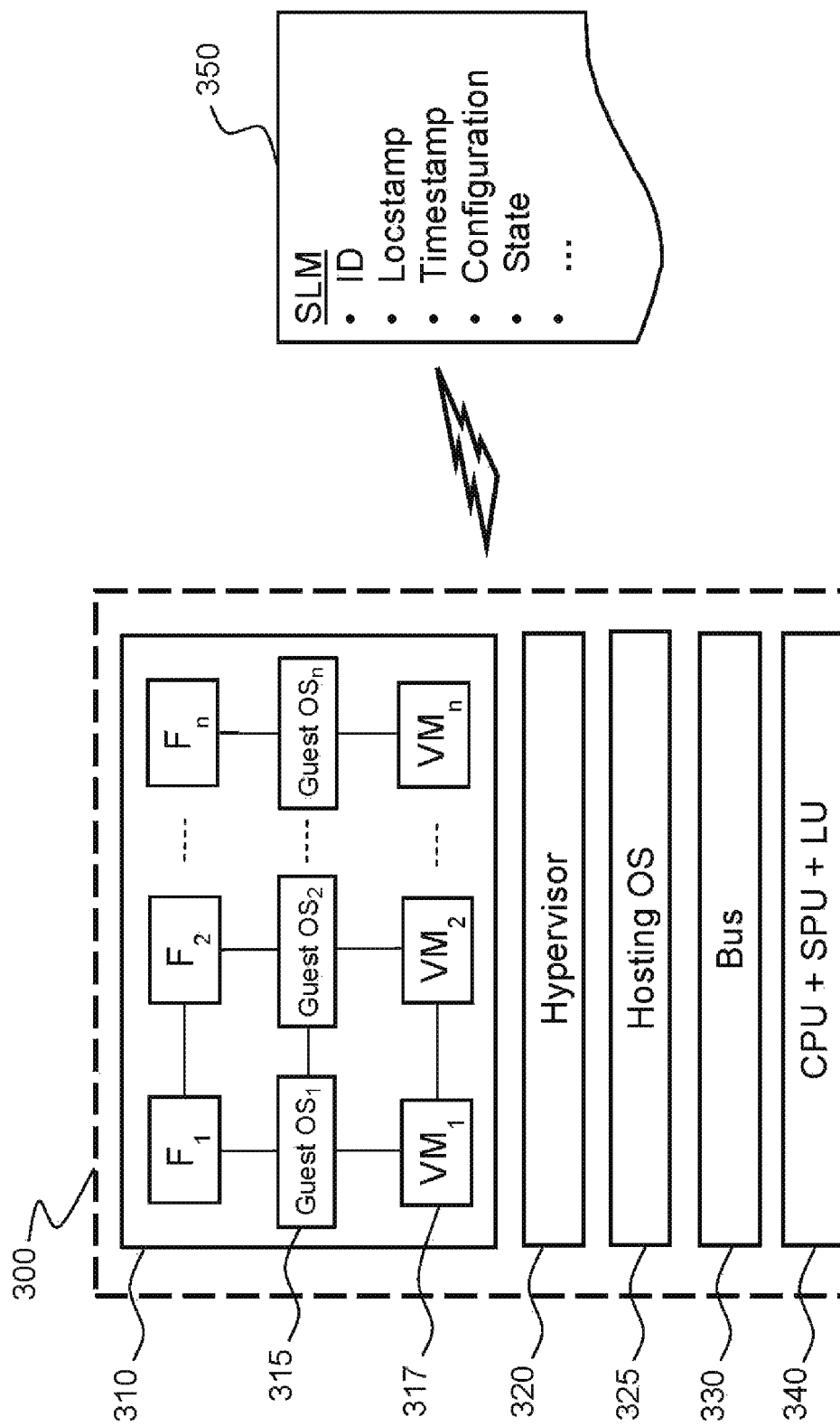
FIG. 3 represents an example of a functional architecture of a trusted computing node according to the invention.

FIG. 3 represents an example of a functional architecture of a trusted computing node according to the invention.

A Trusted Computing Node (TCN), 300, comprises a number of modules which are not different from computing nodes of the prior art, i.e. a collection 310 of tasks/functions 310, VMs, 317, a Hypervisor, 320, guest operating systems, 315 and a bus 330. This refers to a "bare metal architecture". As a variant, another classical architecture ("hosted architecture") includes a hosting operating system, 325.

Module 340 notably distinguishes the TCN from the prior art computing nodes. It combines in the same logical module, the different physical structures of which will be discussed below, a CPU, a SPU and a Localization Unit (LU). The LU is configured to acquire signals from one or more Global Navigation Satellite Systems (GNSS). A description of the LU, its physical configuration and its processing is given in relation to FIG. 5. At this step, it is enough to say that the processing of the LU is capable to generate at least the Cartesian coordinates X, Y, Z or polar coordinates $\rho$, $\theta$, $\varphi$, of the TCN in the earth frame of reference. These coordinates constitute a "location stamp" or locstamp of the TCN.

The SPU contains a unique identifier, which will be used as the TCN's ID.

According to the invention, a Secure Location Message or SLM, 350, will be created comprising the ID and locstamp, which may be encrypted and/or signed by the SPU. Other data may be added to the SLM, as will be discussed in relation with FIG. 6 below. The creation of the SLM will be performed by an application residing on the TCN. A format of this message will have to be defined and possibly normalized. The message may be posted on specific zone of the TCN or sent to other nodes, including supervisory nodes, using a fixed line communication link or a wireless link.

Figure 4A:
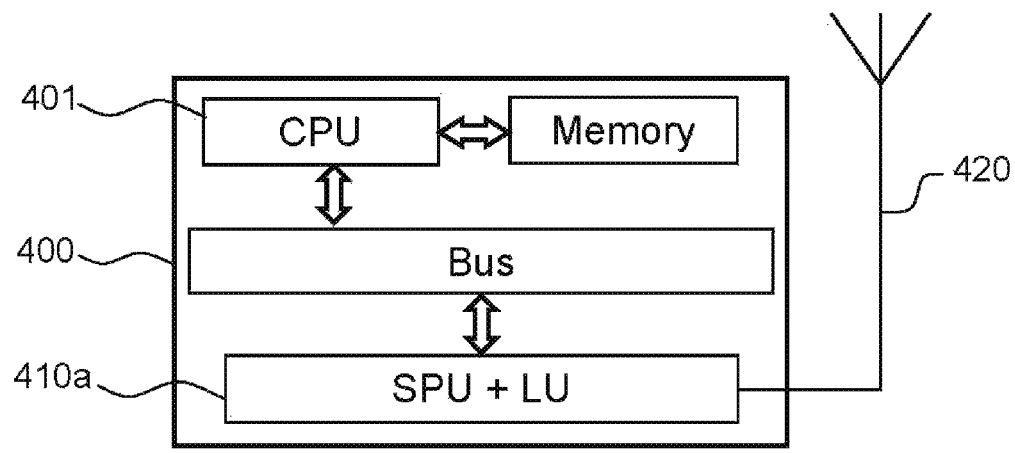
FIGS. 4*a*, 4*b* and 4*c* represent three embodiments of physical architectures of a trusted computing node according to the invention.
Figure 4B:
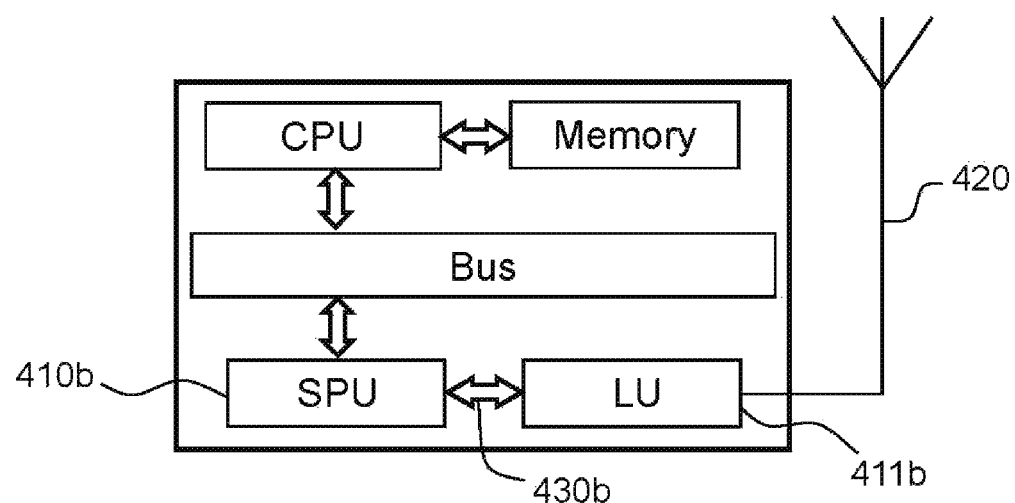
Figure 4C:
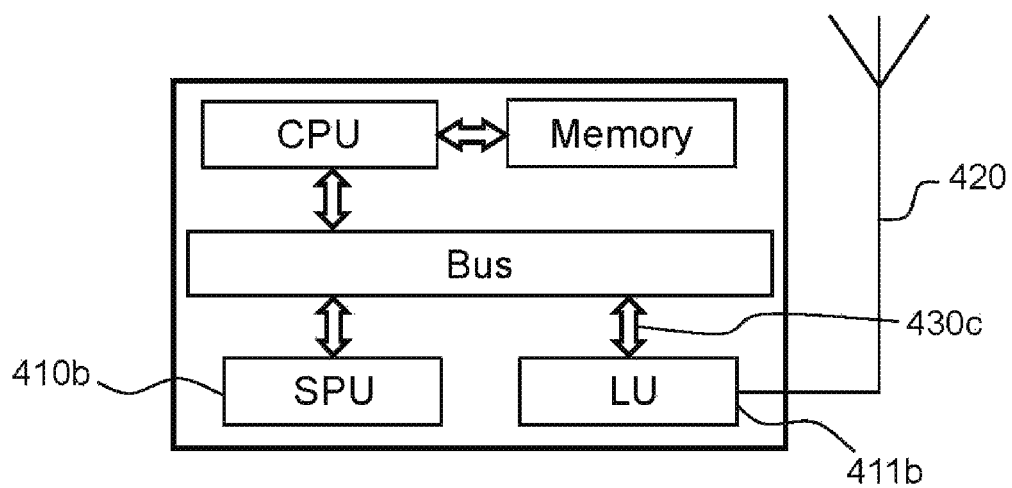

FIGS. 4a, 4b and 4c represent three embodiments of physical architectures of a trusted computing node according to the invention.

In the embodiment of FIG. 4a, the LU is collocated in the same chipset as the SPU, or at least in the same trust zone 410a. A trust zone is defined as either the same chipset which is protected by an anti electromagnetic attacks package or the same chip package having the same feature, the two chips being connected by a secure I/O. It is possible to contemplate merging the CPU, the SPU and the LU in the same chipset, either an FPGA or an ASIC.

An antenna 420 is connected to the trust zone.

In the embodiment of FIG. 4b, the LU 411b is not in the same trust zone as the SPU 410b. For some applications, this may be acceptable. For other applications, notably critical ones, it may be necessary, if the integration of the SPU and the LU cannot be implemented, to establish a secure link 430b between the LU and the SPU. This secure link may use either the authentication certificate generated by the SPU or a simple encryption utilizing a pair of private and public keys embedded in the LU.

Figure 5:
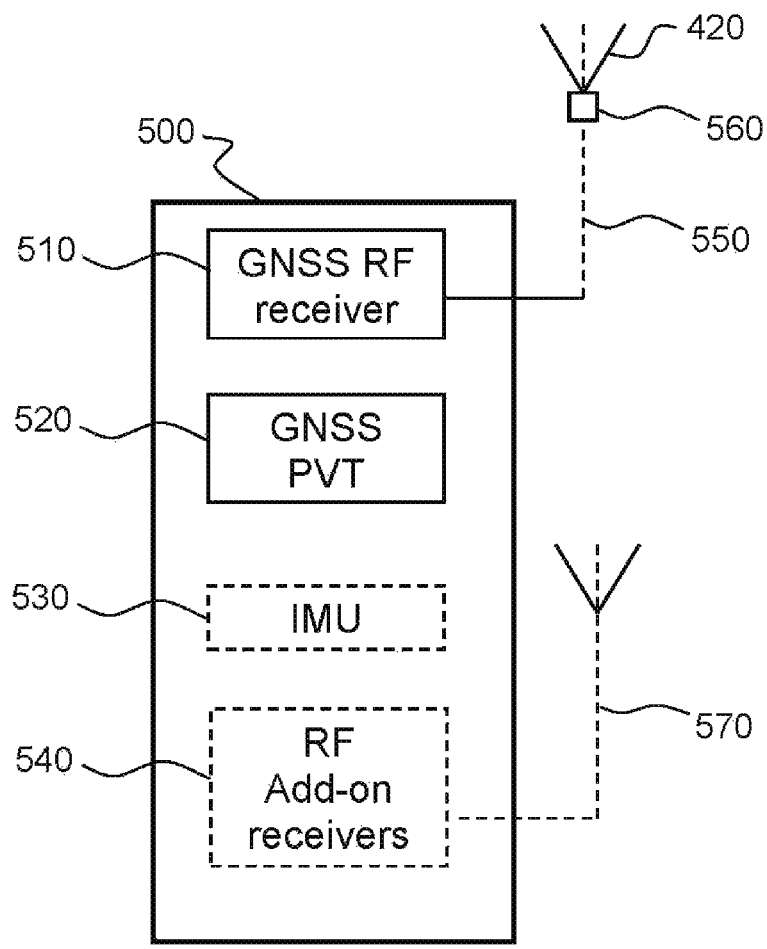
FIG. 5 represents an example of a lay-out of a localization unit according to the invention.

In the variant of FIG. 4c, the LU 411b is also separate from the SPU, but linked to the rest of the system by a connection 430c to the bus, FIG. 5 represents an example of a lay-out of a localization unit according to the invention Currently, two constellations are fully operational, the US Global Positioning System (GPS), and the Russian Glonass. The Chinese constellation, Beidou, is partly operational, and some satellites of the new European constellation, Galileo, have been sent to orbit. Most often, a GNSS comprises a few tens of medium earth orbit satellites. Each satellite emits one or more carrier waves, and possibly sub-carrier waves, in the L-band. Each carrier or sub-carrier wave is modulated by a code.

A GNSS receiver 500 comprises one or more antennas 420, RF modules 510 and data processing modules 520. Using more than one antenna may be useful to mitigate the effect of multi-path (i.e. combinations of line of sight and reflected signals) which disturb reception in urban environment. It may also be useful to detect spoofing (i.e. pseudo-GNSS sources which transmit fake signals to emulate false positions in the receiver). The RF modules comprise code correlators used to correlate a signal which is acquired and tracked with local replicas of the known codes of each satellite to determine the emitting satellites and the pseudo-range along the axis between the antenna of the receiver and the satellite. When the signals of at least four satellites can be acquired and tracked, the data processing module is capable of calculating the Cartesian coordinates of the receiver from the pseudo-ranges, as well as its velocity. This is normally done in a Kalman filter. As a by-product, the time reference of the satellites can be recorded. This data is known as the GNSS PVT.

Without specific processing, the precision of the PVT, with 4 satellites in view, and without multipath is of a few tens of meters, which can be sufficient for a number of applications, including a C-RAN (Cloud Radio Access Network) architecture. With adequate corrections, notably of the ionospheric errors due to the deviation of the electromagnetic waves by the ionosphere, by using the carrier phase, the precision can be improved to a few meters. Integration of external aids can improve the precision to a few tens of centimeters or even a few centimeters.

This precision may be specifically useful for mobile TCNs, for instance if they are embedded in driver-free cars or on drones.

Some receivers are capable of acquiring and tracking satellites of a plurality of constellations, which normally requires correlators capable of processing codes having different lengths. This may improve availability, integrity and resilience to spoofing.

All GNSSs provide a reserved service which uses allocated carrier waves which carry an encrypted code. For a number of applications which are regulated by Government authorities, like legal interception, it may be advantageous to use an encrypted service.

When a TCN is housed in a building, possibly in its basement, to ensure that the GNSS signals reach the LU receiver, there are a number of options: it is possible to locate the antenna 420 in the air (on top of the building, or at a window) and install a cable 550 to lead the signals to the receiver. An antenna amplifier 560 will most of the time be necessary. If more than one TCN is housed in the same data center, it may be preferable to install repeaters which will distribute the signal within the data center forming a signal distribution system. This distribution system may consist of an optical fiber distribution system where the received RF signal is carried over optical fiber, a wired RF distribution system, or retransmitting of the GNSS signal using wireless repeaters. Physical protections could be added on this distribution system.

Optionally, the LU may also include an Inertial Measurement Unit (IMU) 530. An IMU comprises one or more of accelerometers, gyroscopes and magnetometers and may preferably include an independent power supply to allow continued functionality whist the equipment is powered off or transported. These sensors exist as Micro-Electro Mechanical Sensors (MEMS) which can be integrated in the same secure module as other functions like a GNSS receiver. The monitoring of the IMU signal will allow to track possible moves of the TCN so that local or remote processing (see description in relation with FIG. 7), can confirm that a location determined by the GNSS receiver can be trusted. More specifically, if the locstamp is identical at two different times whilst the IMU has recorded a move, the locstamp will not be validated. For this functionality to work, the IMU needs to be constantly powered (e.g. electric battery on the same electronic board).

Optionally, the LU may further include a cell-phone receiver 540. When the TCN is operated by a cell-phone company operator, it can confirm the GNSS-determined position by comparing with the position determined by a triangulation of its base station. These positions may also be made available to other operators, notably Government authorities.

Optionally, the LU may also include a RF scanner to receiver other radio or light signals from which the position may be determined and/or correlated.

Figure 6:
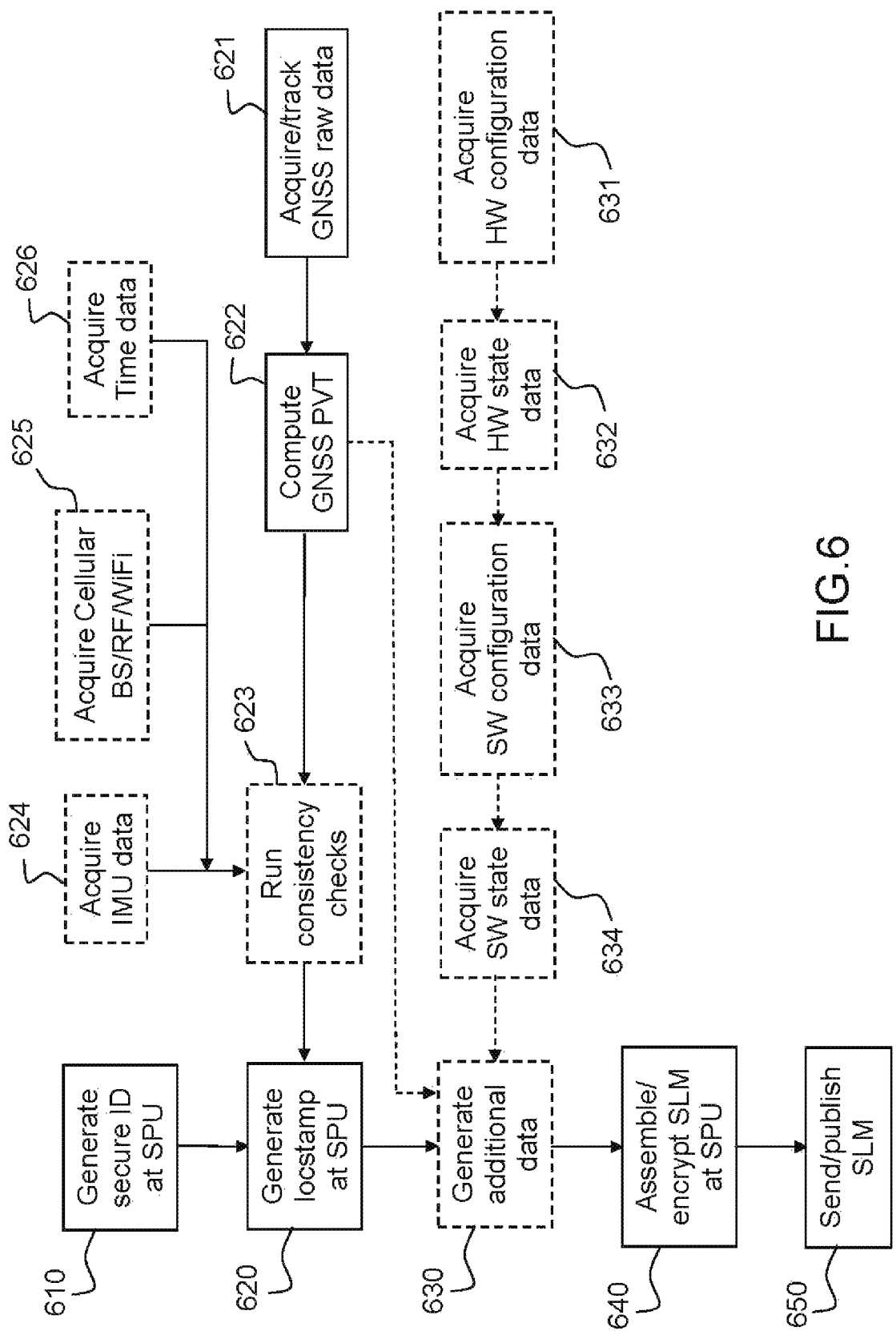
FIG. 6 is an example of a flow chart of a method to generate a locstamp and a secure location message at a computing node, according to the invention.

FIG. 6 is an example of a flow chart of a method to generate a locstamp and a secure location message at a computing node, according to the invention.

First, a secure ID of the TCN is generated at the SPU at step 610.

A locstamp is generated at the SPU at step 620. Minimally, this locstamp is produced at the output of step 622 of PVT computation, which is itself performed at the output of step 621 of acquisition of the GNSS raw data.

Optionally, a number of consistency checks may be performed at step 623. For instance, IMU data may be acquired and processed at step 624 to check that, if the new GNSS position is identical to a previously recorded position, which may be stored in memory of one of the processors, there was no movement recorded by the IMU. In case the said IMU has recorded a movement, an index of consistency check may be generated with a value lower than 100%, at step 623 and appended to the position data. In case an authorized movement has been recorded in a local memory with an approved certificate of trust, the index of confidence would remain at 100%.

As another option, possibly combined with the previous one, it is possible, at step 625, to compare the GNSS PVT result with a position calculated by triangulation of cell phone base stations positions or a position resulting from another RF scanner.

It is also possible to acquire a time reference at step 626. For instance, the time reference may be the Network Time Protocol or NTP reference. This time reference may be compared to the time computed at step 622.

When consistency checks are successful, this information may be adjoined to the SLM either as a binary information (Yes/No) or as a score on a scale which may be for instance of from 0 to 100%. Another scale of confidence check may of course be set as a variant, within departing from the scope of the invention.

Additional data may be generated at step 630. GNSS time data computed at step 622 may be appended to the SLM. Other data may be appended to the SLM. For instance Hardware configuration data may be acquired at step 631. Hardware state data may be acquired at step 632. Software configuration data may be acquired at step 633 and software state data may also be acquired at step 634. Measurement metrics of the hardware and/or software configurations of the TCN might include one or more of power consumption, various temperatures (CPU, memory, chassis, memory read and/or write errors, intrusion detection status, Network Interface Card (NIC), Medium Access Control (MAC) addresses, hypervisor and/or VM status, software driver version, memory usage, IP address attribution, sub-equipments MAC addresses. Other state variables may be captured and appended to the SLM, possibly if they are deemed to offer a cost/benefit advantage for a defined application.

The content of the SLM will then be formatted according to a messaging protocol. As an option, the SLM may be cryptographically signed using the SPU encryption function, at step 640. As an additional option, the SLM may be encrypted.

Then the SLM will be either sent to an orchestrator, to a scheduler or to peer TCNs at a step 650. Alternatively, the SLM may be posted using a publish/subscribe protocol. The SLM can then be refreshed at a predefined frequency and the orchestrator and other TCNs may subscribe to the service of getting updates of one or more listed TCNs.

As a variant, an abstract of the SLM may be posted to identify a country/region where the TCN is located. If the TCN is part of a public cloud computing facility, the posting of this information may be used by the Management and Orchestration function (MANO) to avoid migration of specific applications to this TCN.

Figure 7:
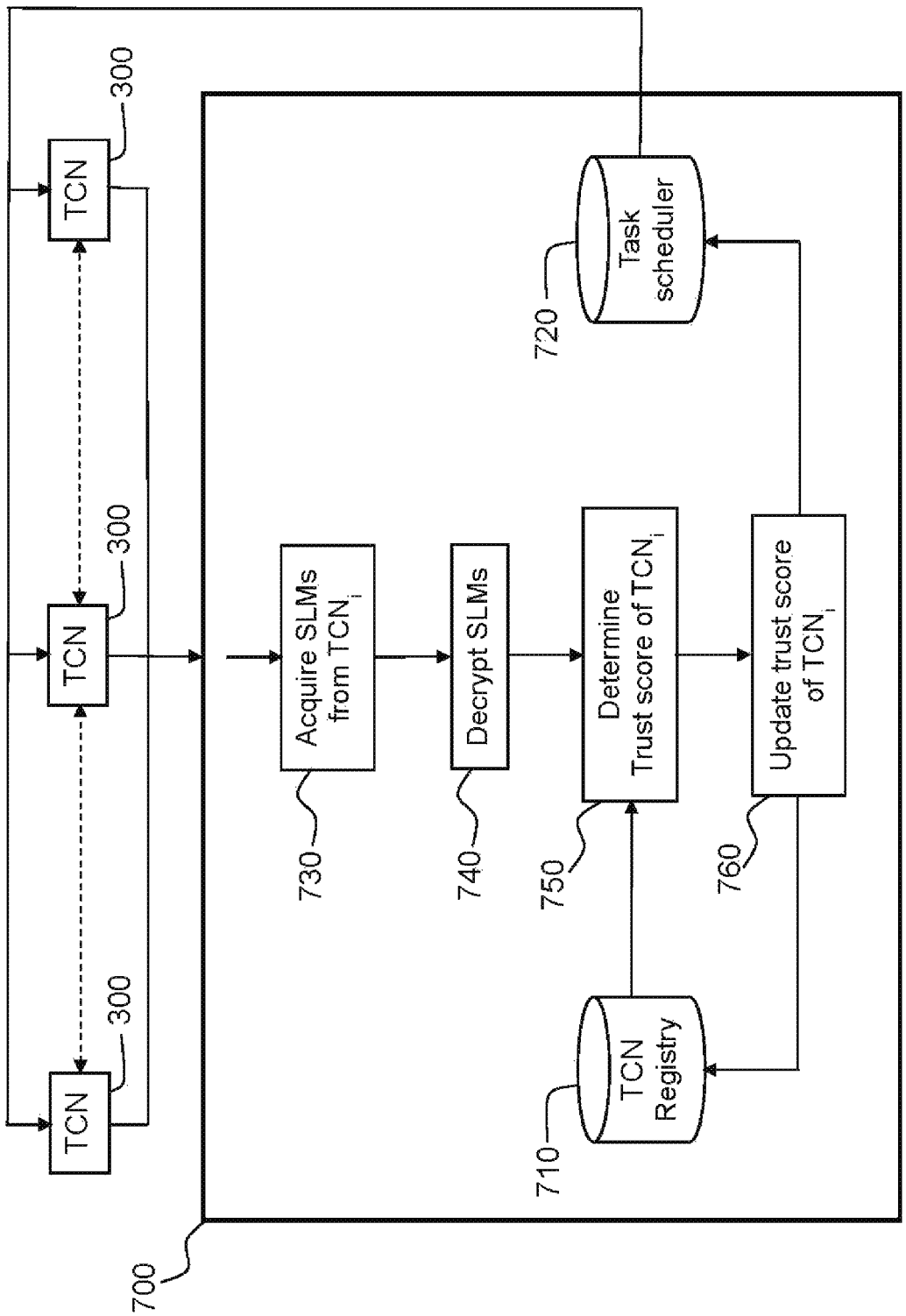
FIG. 7 is an example of a functional diagram of a method to process secure location messages in a trusted computing nodes architecture, according to the invention.

FIG. 7 is an example of a functional diagram of a method to process secure location messages in a trusted computing nodes architecture, according to the invention.

A number of TCNs 300 are connected through a network to an orchestrator 700.

Advantageously, the orchestrator or a scheduler contains or has access to a TCN Registry 710. The TCN Registry maintains a list of all TCNs, with their IDs, their current location, their active configuration (hardware and software) and possibly their expected key parameters of operation. In the variant where expected parameters of operation are recorded in the TCN Registry and measured at a TCN, an application may run consistency checks between the expected values and the actual measured values received from a TCN to amend the consistency checks run at the Registry.

In a variant, the TCN Registry may be operated by a trusted third party, which is independent from the operator of the cloud computing service. In this variant, the trusted third party and the operator of the TCN Registry may have to execute a covenant whereby the third party registry would accept the signature of the TCN's SPU at their face value, subject to the operator of the TCN Registry complying with operating, audit and traceability procedures.

When a SLM is acquired (from a message or through a Publish/Subscribe protocol) at step 730, it is then decrypted (step 740). The locstamp is compared to the data recorded in the TCN Registry. If the locstamp matches the record within a preset threshold, a maximum trust score may be determined and the certification of the TCN is renewed. If not, a zero trust score is determined and certification may be denied or repudiated (Step 750). A routine may be implemented to process cases in error. Also a threshold may be defined within which certification is renewed. A trust score may be defined which may be a function of various parameters: results of different consistency checks possibly performed at the TCN itself or at the orchestrator/scheduler level. Optionally, consistency checks may be performed between peers. For instance, when two TCNs are deemed to operate in specific areas, the sending TCN may acquire by a Subscribe query the position of a candidate receiving TCN before sending a message to the candidate receiving TCN. Alternatively, a TCN may regularly poll the available SLMs of other TCNs to which it regularly sends messages and maintain locally a list of TCNs with their confidence score, so that it can avoid sending messages/data to untrustworthy TCNs. Alternatively, a list of untrustworthy TCNs, possibly for specific applications, may be broadcast regularly by the TCN Registry. The trust score of the TCN recorded in the TCN Registry is updated at step 760.

Based on the last current trust score, the parameterization of the task scheduler 720 may be updated. Task scheduling may be based on available resources, QoS, cost, national restrictions or security constraints. For instance, some applications may require that the trust score of TCN be higher than a set minimum. This constraint will be entered in the optimization algorithm to define the allocation of tasks to the computing nodes and the resulting allocation will be suboptimal for the other criteria. As an option, the optimization algorithm may be dynamically updated based on a policy defined by the operator.

All write/read operations in the TCN Registry may be advantageously timestamped and archived for audit purposes.

Optionally, the functions of the orchestrator may be implemented in other parts of the management facility of the network infrastructure. For instance, if the operator of the network also manages the physical layer of the network infrastructure and/or possibly the virtual overlay of said physical layer, for instance in a SDN architecture, it is possible to couple the control functions defined above in the management function of the SDN.

In some embodiments of the invention, it is possible to include in a TCN, notably in its hypervisor or its VMs, an application which confines a number of tasks/functions to be executed on the TCN on this TCN and avoid migration, or only authorize migration to TCNs located in a predefined geographic area and/or to TCNs having a predefined minimum trust score.

In some embodiments of the invention, it is possible to only archive the SLMs with time stamps in a memory of the SLM, for audit purposes.

In some other embodiments of the invention, it is possible to publish the SLMs, so that they may be accessed by the orchestrator/scheduler of the network of TCNs for reuse, as previously described.

In some other embodiments of the invention, it is possible to configure the TCNs so that they are sent to the orchestrator/scheduler of the network of TCNs for reuse, as previously described.

In some other embodiments of the invention, it is possible to configure the creation of the SLMs in such a way that they are appended to some or all the messages/data to be sent to other TCNs, or to a predefined list of TCNs, the list of TCNs being reconfigurable, possibly dynamically.

The examples disclosed in this specification are only illustrative of some embodiments of the invention. They do not in any manner limit the scope of said invention which is defined by the appended claims.

The invention claimed is:

1. A computing node comprising:
  a central processing unit (CPU);
  a secure hardware processing unit, configured to execute one or more of an authentication, an encryption or a decryption functions;
  an access to position data of the computing node, said position data obtained from a localization unit comprising one or more global navigation satellite system receivers localized at the computing node;
  wherein the secure hardware processing unit is configured to produce a locstamp derived from the position data and an ID stamp of the computing node, and the computing node is configured to generate a secure location message comprising the locstamp and the ID stamp;
  the computing node further containing an output port configured to send an out-bound data stream comprising said secure location to a scheduler via a communication network, said secure location is used by said scheduler as a constraint of allocation of computing tasks, the computing node further comprising an input port configured to receive an in-bound data stream defining a computing task from said scheduler via said communication network for execution by the computing node, wherein one or more secure location messages from one or more of computing nodes are obtained; the ID stamp and the locstamp in the one or more secure location messages with ID data and location data of the one or more computing nodes in a registry of trusted computing nodes are compared; a trust score of the computing node is determined; and the determined trust score of the one or more computing nodes is used as the constraint of allocation of computing tasks.

2. The computing node of claim 1, wherein the one or more global navigation satellite system receivers and the secure processing unit share a same trusted zone.

3. The computing node of claim 1, wherein the one or more global navigation satellite system receivers are configured to generate trusted position data.

4. The computing node of claim 3, wherein the one or more global navigation satellite system receivers are configured to detect spoofing.

5. The computing node of claim 1, further comprising an access to an output of an inertial measurement unit mounted with the computing node.

6. The computing node of claim 1, further comprising an access to a receiver of a cellular phone network providing an access to computing node position data based on positions of base stations of the cellular network.

7. The computing node of claim 1, further comprising an access to a network time reference.

8. The computing node of claim 1, wherein the secure location message further comprises one or more of a timestamp, a signature of the computing node, a description of the resources of the computing node and a state of the computing node.

9. The computing node of claim 1, further configured to run one or more virtual machines and a hypervisor.

10. A method of operating a collection of computing nodes, one or more of the computing nodes comprising:
a central processing unit (CPU);
a secure hardware processing unit, configured to execute one or more of an authentication, an encryption or a decryption functions;
an access to position data of a computing node of the one or more computing nodes, said position data obtained from a localization unit comprising one or more global navigation satellite system receivers localized at the computing node;
the secure hardware processing unit being configured to produce a locstamp derived from the position data and an ID stamp of the computing node;
the computing node being configured to generate a secure location message comprising the locstamp and the ID stamp;
said method comprising making available at a scheduler an information representative of the secure location message via a communication network; receiving an in-bound data stream defining a computing task from said scheduler via said communication network, and executing said computing task by the computing node; comparing the ID stamp and the locstamp in the secure location message with ID data and location data of the computing node in a registry of trusted computing nodes; determining a trust score of the computing node and using the determined trust score of the computing node as a constraint of allocation of tasks at said scheduler; receiving an in-bound data stream defining said computing task from said scheduler via said communication network, and executing said computing task by the computing node.

11. The method of claim 10, further comprising recording the determined trust score of the one or more computing nodes in the registry of trusted computing nodes.

12. The method of claim 11, further comprising obtaining the determined trust score of the one or more computing nodes at a task scheduler.

13. The method of claim 10, further comprising archiving the secure location message at the trusted computing node, together with a timestamp.

14. The method of claim 10, further comprising:
obtaining a secure location message available at one of the computing nodes in the collection of computing nodes at another computing node;
comparing the ID stamp and the locstamp in the one or more secure location messages with ID data and location data of the computing nodes in the registry of trusted computing nodes;
determining at the another computing node a trust score of the one of the computing nodes.

* * * * *